US012233492B2

(12) United States Patent
Rogers

(10) Patent No.: US 12,233,492 B2
(45) Date of Patent: Feb. 25, 2025

(54) INERT GAS WELDING TORCH HEAD WITH ADJUSTABLE ELECTRODE RECEIVER

(71) Applicant: Jesse Rogers, Penn Yan, NY (US)

(72) Inventor: Jesse Rogers, Penn Yan, NY (US)

( * ) Notice: Subject to any disclaimer, the term of this patent is extended or adjusted under 35 U.S.C. 154(b) by 607 days.

(21) Appl. No.: 17/566,120

(22) Filed: Dec. 30, 2021

(65) Prior Publication Data

US 2022/0118544 A1    Apr. 21, 2022

Related U.S. Application Data

(63) Continuation-in-part of application No. PCT/US2020/044854, filed on Aug. 4, 2020.

(60) Provisional application No. 63/232,594, filed on Aug. 12, 2021, provisional application No. 62/882,700, filed on Aug. 5, 2019.

(51) Int. Cl.
*B23K 9/29* (2006.01)
*B23K 9/167* (2006.01)

(52) U.S. Cl.
CPC .............. *B23K 9/296* (2013.01); *B23K 9/167* (2013.01)

(58) Field of Classification Search
CPC . B23K 37/00; B23K 9/32; B23K 9/29; B23K 9/291; B23K 9/296; B23K 9/167
See application file for complete search history.

(56) References Cited

U.S. PATENT DOCUMENTS

| 2,395,228 | A | 2/1946 | Liniger |
| 3,116,406 | A | 12/1963 | Barnes |
| 4,924,065 | A | 5/1990 | Vito |
| 2004/0050824 | A1 | 3/2004 | Samler |
| 2011/0278274 | A1* | 11/2011 | Rogers .................. B23K 9/296 219/136 |

OTHER PUBLICATIONS

International Preliminary Report on Patentability for PCT/US2020/044854 Feb. 17, 2022.
International Search Report and Written Opinion for PCT/US2020/044854, 7 pages. Oct. 21, 2020.

* cited by examiner

*Primary Examiner* — Robert G Bachner
(74) *Attorney, Agent, or Firm* — Duane C. Basch

(57) ABSTRACT

A removable arc welding torch head having a variable electrode receiving aperture that includes a number of discrete, slidable wedges guided within a conical interior surface to enable the head to be used with electrodes of various diameters without changing components of the torch head. The removable nature of the torch, while providing for adequate flow of inert gas, provides an adjusting collar that engages the wedges and forms an adjustable opening for an electrode to be inserted therein.

20 Claims, 17 Drawing Sheets

INERT GAS WELDING TORCH HEAD WITH ADJUSTABLE ELECTRODE RECEIVER

PRIORITY CLAIM AND CROSS-REFERENCE

This application is a continuation-in-part of, and claims priority, under 35 U.S.C. § 120 from, PCT Patent Application Number PCT/US2020/044854, for an INERT GAS WELDING TORCH HEAD WITH ADJUSTABLE ELECTRODE RECEIVER, filed Aug. 4, 2020, by J. Rogers, which claims priority under 35 USC § 119(e) from U.S. Provisional Patent Application No. 62/882,700 for an INERT GAS WELDING TORCH HEAD WITH ADJUSTABLE ELECTRODE RECEIVER, filed Aug. 5, 2019 by Jesse Rogers, and this application further claims priority under 35 USC § 119(e) from U.S. Provisional Patent Application No. 63/232,594 for an INERT GAS WELDING TORCH HEAD WITH ADJUSTABLE ELECTRODE RECEIVER, filed Aug. 12, 2021 by Jesse Rogers, each of which is hereby incorporated by reference in its entirety.

This application cross-references U.S. Pat. No. 9,789,560 B2 for an ARC WELDING TORCH HAVING A VARIABLE ELECTRODE RECEIVER, issued Oct. 17, 2017 to Jesse Rogers, which is hereby incorporated by reference in its entirety.

TECHNICAL FIELD

While a self-centering adjustable electrode receiver may be provided for a gas shielded welding torch, it is imperative that in order to facilitate the use of such devices, users (e.g., welders) be enabled to easily swap or switch heads used on conventional welding torches. For example, it is expensive to replace or swap out an entire inert gas welding torch in order to accommodate different electrode sizes. The disclosed welding torch head is suitable for use with multiple torch types, and as such provides the added advantage of an adjustable electrode receiver in a replaceable inert gas welding torch head. Thus, welders can now have the advantage of an adjustable electrode receiver without having to replace an entire welding torch—they only need to install the improved torch head in order to use a wide range of electrode sizes. The removable torch head includes electrode securing wedges that uniformly contact electrodes of various shapes, diameters, lengths and orientations. The adjustable electrode securing wedges provide a robust and uniform contact with the electrode and thus reduce the likelihood of resistive heating in the contact region.

BACKGROUND AND SUMMARY

Gas tungsten arc welding (GTAW), also known as tungsten inert gas (TIG) welding, is an electrical welding process that uses the arc from a tungsten electrode to produce heat sufficient to create a molten or plasma "puddle" to weld or fuse work pieces together. Inert gas welding can be used for a number of metals and their alloys and, as a result, is a very versatile welding process. However, the welding parameters and electrode sizes often need to be adjusted based upon the material being welded and welding conditions. For example, the diameter of the non-consumable tungsten electrode can vary between about 0.5 mm and about 6.4 mm (0.020 in.-0.25 in.) depending upon the workpiece material and type of weld, and the length of the electrodes can range from about 75 mm to about 610 mm (3 in.-24 in.). Conventional inert gas welding torches typically employ a range of collets to allow the user to disassemble the welding head and employ different collets for each electrode size—a time consuming process, particularly if the user needs to regularly switch electrode sizes.

In an inert gas welding process, the weld area is protected from atmospheric contamination by an inert shielding gas, such as argon. A welding power supply provides an electrical current that, upon creation of an arc between the electrode and the material being welded, produces concentrated thermal energy sufficient to weld the piece(s). The focused heat is sufficient to place the contact area, as well as an optional filler rod, into a plasma state. Heat is generated by the welding operation and as a result, the welding torch may require a cooling system. Air cooling systems are most often used for low-current operation, however, water cooling is sometimes required within the torch for TIG welding systems in order to dissipate heat in higher current applications or in applications requiring longer duty cycles.

As noted above, tungsten arc welding gas shielding torches employ dedicated collets and collet bodies for holding a specific diameter electrode within the torch head. Electrode collets are typically made from copper in a tubular shape and have at least two longitudinal gaps or slots to allow the diameter of the collet to be radially compressed when moved in relationship to the interior conical shape of an adjacent collet body. This compression of the collet minimally reduces the opening therein to engage and secure the electrode within the nominal internal radial area of the collet. Since the collet is compressed against the electrode over a relatively small area, the electrical current density per unit area is significant and substantial heat may be generated due to the electrically resistive connection to the electrode, which also may perpetuate peripheral arcing within the collet. Accordingly, the electrode, as well as the collet, have a tendency to erode over time due the effect of repetitive expanding and contracting caused by both the resistive and conducted heating and subsequent cooling. The situation is further aggravated due to the copper collet having a coefficient of thermal expansion of $9.8 \times 10^{-6}$ in/in/° F., whereas the tungsten electrode only expands about half as much ($3.9 \times 10^{-6}$ in/in/° F.), thereby potentially causing a loose fitting electrode while welding, and therein further increasing the electrical resistance and/or causing the electrode to become unstable and to move within the torch head.

Collets and collet bodies are typically provided in at least six aperture sizes to accommodate various diameters of the job specific electrode. Therefore, a significant limitation of the existing collets is that each electrode size requires a specific corresponding collet and collet body. Consequently, each time an alternate electrode diameter is required, the collet assembly must be interchanged as well. For example, it is required to have on hand at least one ⅟₁₆-inch collet and collet body to accompany a ⅟₁₆-inch tungsten electrode, as well as a ⅛-inch collet and collet body for a ⅛-inch electrode, and so forth. This unfortunately becomes a logistical challenge, as well as a time-consuming exercise each time the electrode is interchanged for another size. Moreover, the use of collets also prevents the reversal (swapping end-for-end) of electrodes that may develop a bead or enlarged tip that prevents it from passing through the collet opening.

When an electrode comes in direct contact with a work piece or filler wire the tip becomes contaminated by "foreign" metal that is transferred and adheres to the tip of the tungsten electrode. This added material produces a mushrooming of the tip and requires the electrode to be either reground or replaced. However, the use of a removable welding head with an adjustable electrode receiver, as disclosed herein, provides a sufficient opening or adjustability for the mushroomed end of the electrode to be flipped, end for end, and reinserted as the enlarged and contaminated end is passed through the adjustable opening. As a result an electrode may be used twice along between regrinding or replacement. Thus, it is a further objective to provide an electrode receiver that will allow insertion of an expanded/contaminated end of an electrode therethrough, and avoiding a problem with the use of sized collets to hold electrodes.

In one embodiment disclosed, the internal metal parts of a torch are preferably made of a conductive metal such as copper or brass in order to conduct electrical current and transfer heat with minimal resistance across a relatively small contact area. The body of the torch is made of heat-resistant, insulating ceramics, plastics and similar materials for both covering the metal components as well as providing insulation from heat and electricity to protect the welder. Additionally, provisions may be provided to allow a constant flow of the shielding gas to pass through the torch handle and electrode receiver to the work piece area in order to provide an inert gas region or atmosphere in proximity to the weld.

In the interest of versatility and convenience, a welder should be enabled to select and use any size electrode at any time, to effect optimal welding, without the need to reconfigure the electrode receiver within the torch head. In other words, the configuration of the torch head and associated housing should not dictate the size or shape of an electrode. Therefore, an adjustable electrode receiver, that can be varied as needed to accommodate a variety of different size electrodes, provides a distinct advantage when using an electric welding torch, such as the case with TIG welding.

The embodiments disclosed herein are directed to a removable torch head with an adjustable or variable electrode receiver that replaces conventional heads and eliminates the conventional collets in order to enable use of a plurality of electrode sizes.

In accordance with an aspect of the disclosed embodiments, there is provided a removable electric arc welding torch head having an adjustable electrode receiver, comprising: a hollow plunger, having a first end for threadable connection to a welding torch; a nozzle seat (e.g., high-temperature plastic such as Teflon®), surrounding and operatively connected about the first end of the plunger; a torch body including a tapered interior region, a plurality of apertures to permit gas flow therethrough, and a threaded inside diameter to permit the operative engagement (e.g., threadable engagement) of a chuck back plate thereon, the chuck back plate having an outer diameter for engaging the inner diameter of the torch body, a plurality of radially positioned electrode securing wedges (jaw pieces) forming an electrode aperture therebetween within the tapered interior region of the torch body such that each securing wedge can traverse, in unison, a conical interior surface of the tapered region in a longitudinal direction to form a variable aperture (jaw) therebetween, said securing wedges being further contacted on an end thereof by a plunger thrust cup, the thrust cup in further combination with the plunger and back plate, translating rotation of the plunger relative to the back plate into linear motion of the thrust cup in contact with the electrode securing wedges, and further providing a clamping motion of the electrode securing wedges as a result of their contact with the tapered surface, each of said electrode securing wedges biased away from one another (and toward the conical interior surface of the tapered region), by at least one biasing member therebetween, and an internal conical surface in contact with each securing wedge, said securing wedges further providing electrical contact between an electrode and the conical surface of the torch body; and a nozzle, encircling the torch body and operatively attached at one end thereof to the nozzle seat.

Other and further objects, features and advantages will be evident from a reading of the following specification and by reference to the accompanying drawings forming a part thereof, wherein the examples of the presently preferred embodiments are given for the purposes of disclosure.

The various embodiments described herein are not intended to limit the invention to those embodiments described. On the contrary, the intent is to cover all alternatives, modifications, and equivalents as may be included within the spirit and scope of the welding torch and adjustable electrode receiver as defined by the appended claims.

DETAILED DESCRIPTION

Figure 2:
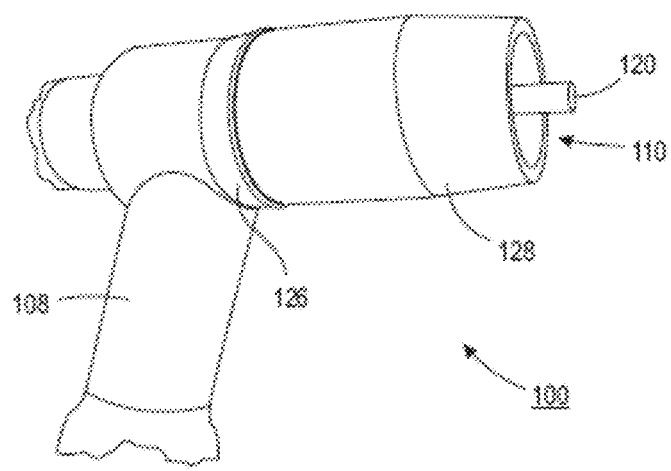
FIG. 2 is a perspective view of an embodiment of the inert gas welding torch head with an adjustable electrode receiver attached to a conventional torch handle.

Referring now to the drawings where the showings are for the purpose of illustrating a preferred embodiment of the removable torch head with an adjustable electrode receiver. As will be appreciated, the disclosed welding torch head is one part of a gas tungsten arc welding system. In one embodiment such a welding system includes a power supply, an inert gas supply, a water/liquid cooler and a torch assembly including a torch head 100 as depicted in FIG. 2, for example. In practice, a workpiece (not shown) is electrically connected to the power supply to provide either −DC, +DC or AC through a clamp and a return cable electrically connected to the workpiece (not shown). Torch 100 provides means for delivering the inert gas as well as an arc formed within an air gap between the tip of the tungsten electrode 120 and the work piece, where the arc is sufficient to generate the heat required to fuse the work pieces together. Torch 100 may be further connected to a water or chilled liquid supply for cooling of the torch when a high current and/or an extended duration welding operation is performed.

Figure 1:
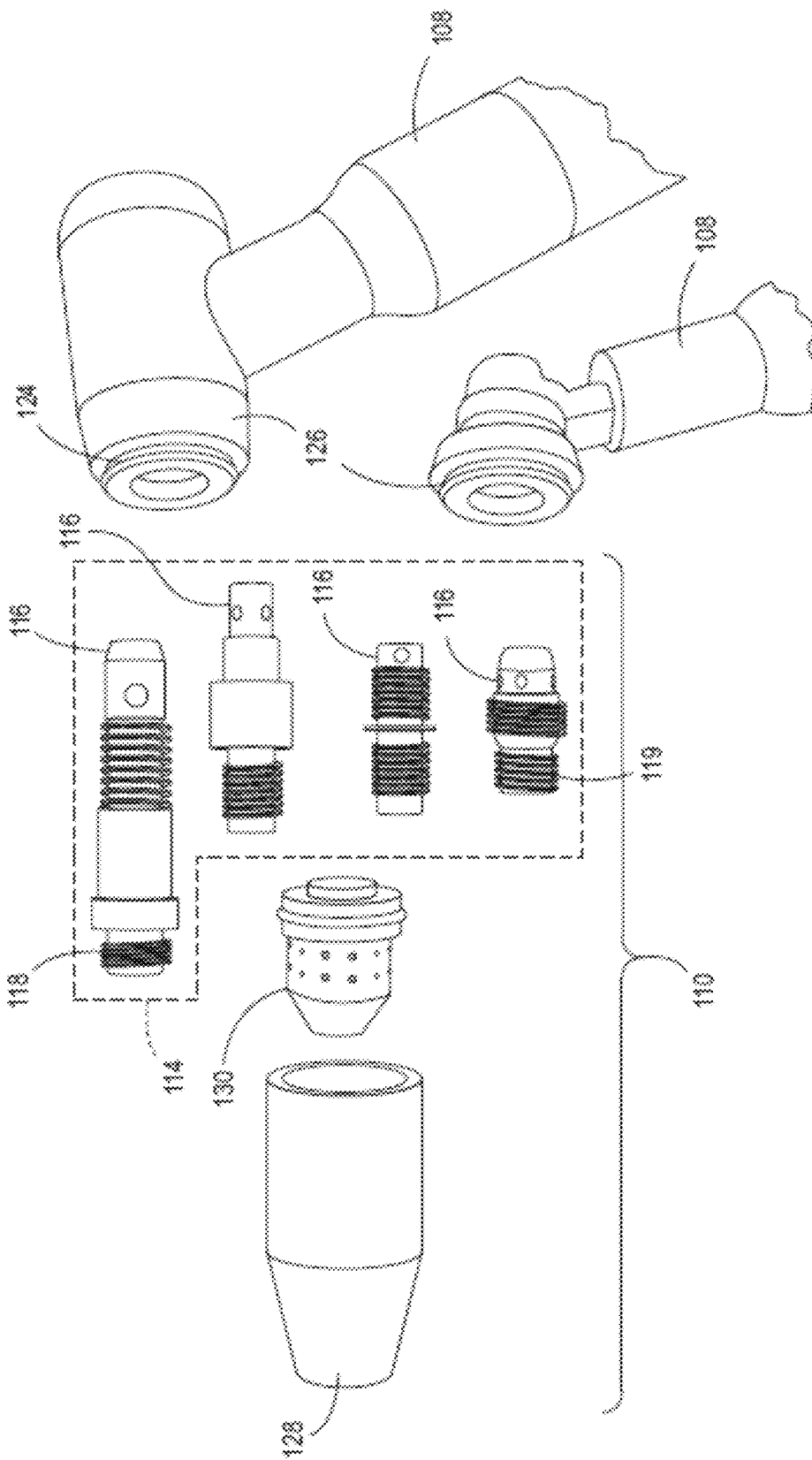
FIG. 1 is a perspective view of a TIG welding torch in accordance with disclosed embodiments, showing two welding torches to which the replaceable head may be attached, along with a plurality of plunger pieces suitable to adapt the removable head to various torch types.
Figure 5:
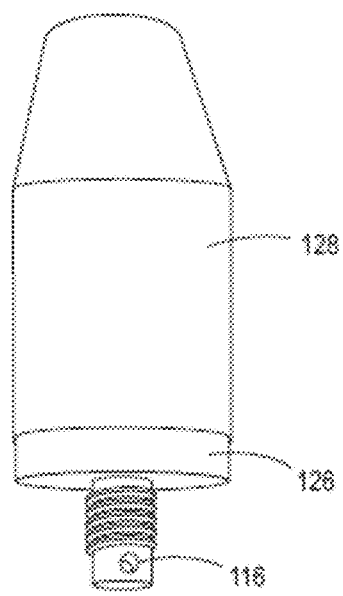
FIGS. 5-7 are illustrative examples of a replaceable inert gas welding head with a torch head body and associated components in accordance with a disclosed embodiment.

The operative mechanical elements of the adjustable electrode receiver reside within a housing of the torch 100, particularly a torch handle 108 to which a removable torch head 110 is attached. As illustrated in the figures, the removable torch head 110 includes a hollow plunger 114 adapted to fit the torch body (see e.g., FIG. 1) and having a first end 116 for threadable connection to welding torch 100. A second threaded end 118 of the plunger is for coupling to and interacting with the torch head body 130. When attached to the welding torch, for example as depicted in FIGS. 1 and 5, the hollow plunger 114 extends outward and provides a stem over which a surrounding nozzle seat 126 can be operatively connected about the exposed threaded end 118 of the plunger. In order to permit use of the removable torch head 110, end 116 of the hollow plunger 114 must be suitable for threaded connection to a conventional torch. While depicted in FIG. 1 with at least two different torch types, such as an WP17 torch and a WP20 torch, it will be appreciated that the removable torch head disclosed herein may be suitable for use with other torches as well. Although not specifically illustrated, it will be appreciated that the rear or back end of the torch typically includes a tailpiece that encloses that portion of the electrode extending through the removable head.

The nozzle seat 126 and the nozzle 128 may be made of a number of materials suitable for high-temperature use, such as machinable or molded ceramic or Pyrex® materials or high-temperature plastics such as glass-filled polytetrafluoroethylene (PTFE) or Teflon®. The inert gas, supplied to the torch and into the removable torch head 110, flows through the hollow interior of plunger 114, where the gas is then directed into the torch head body 130 and nozzle 128, and then out around the electrode in the region of an electrical arc extending between the work piece and the electrode.

Figure 3:
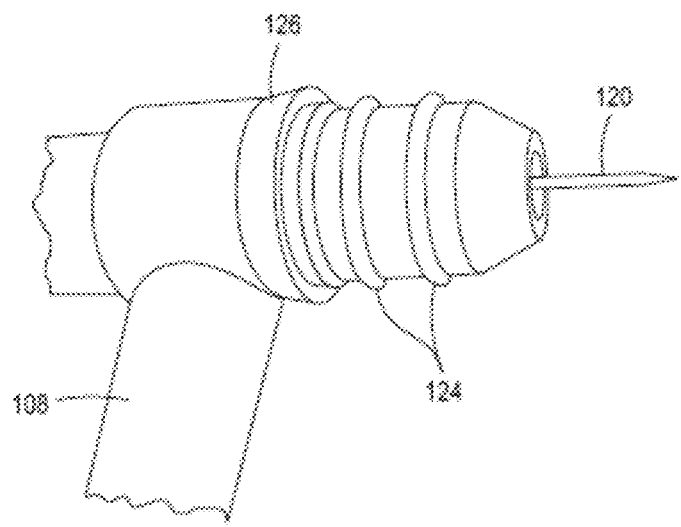
FIG. 3 is a perspective view of the embodiment of FIG. 2 with the gas nozzle removed and with a different diameter welding electrode inserted into the adjustable electrode receiver.
Figure 4:
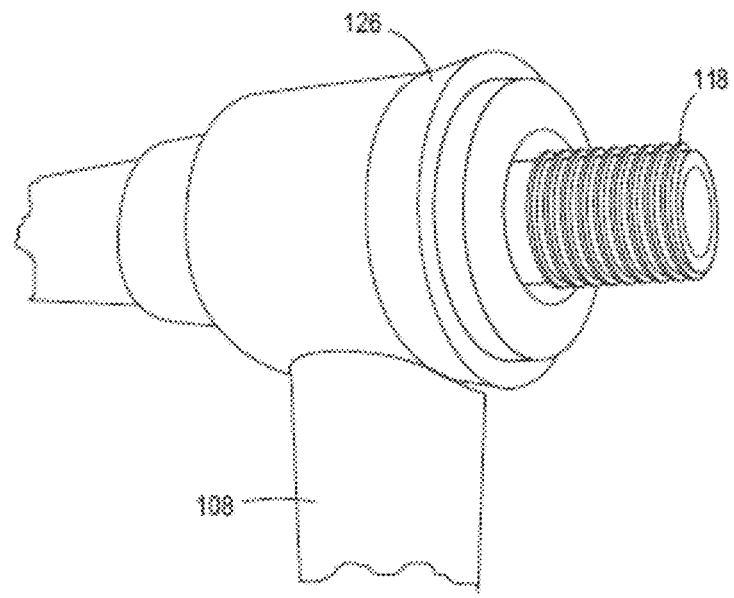
FIG. 4 is an enlarged perspective view of the torch with the plunger and nozzle seat components installed on a torch in accordance with a disclosed embodiment.
Figure 9:
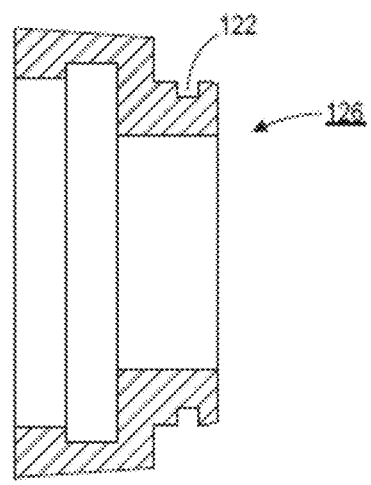
Figure 10:
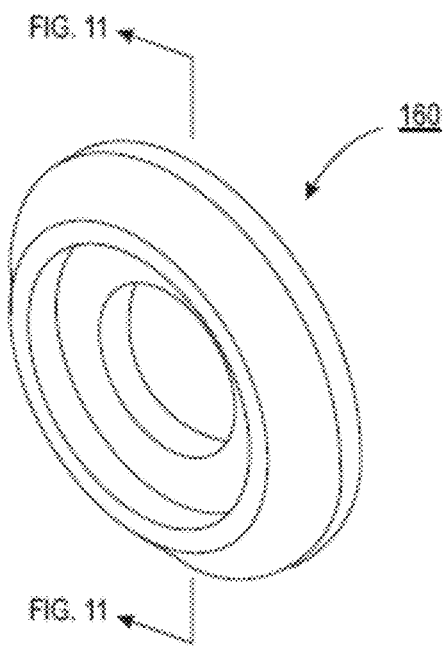
Figure 11:
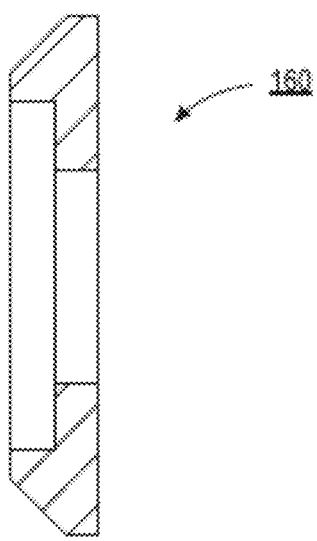
Figure 12:
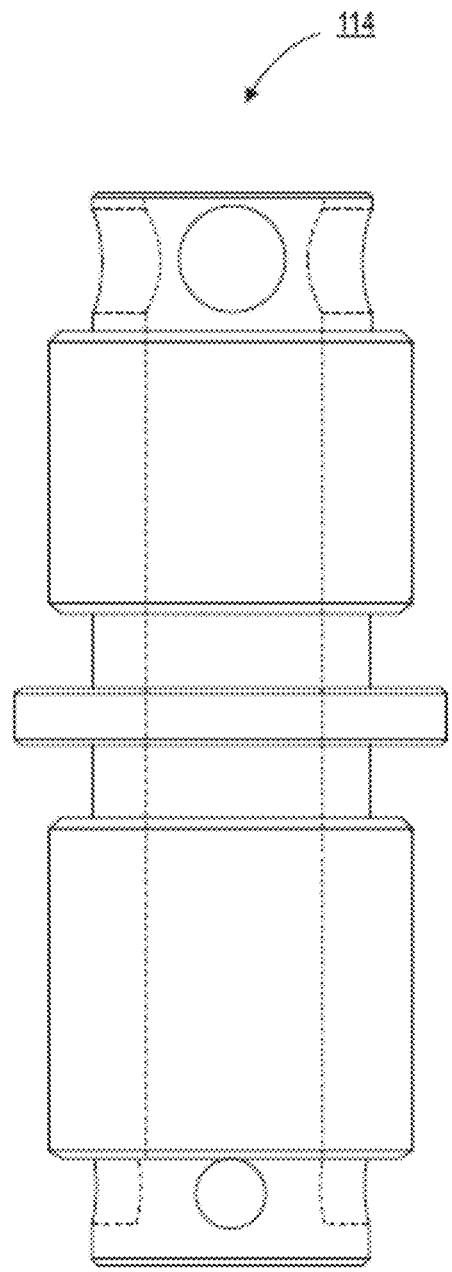
Figure 13:
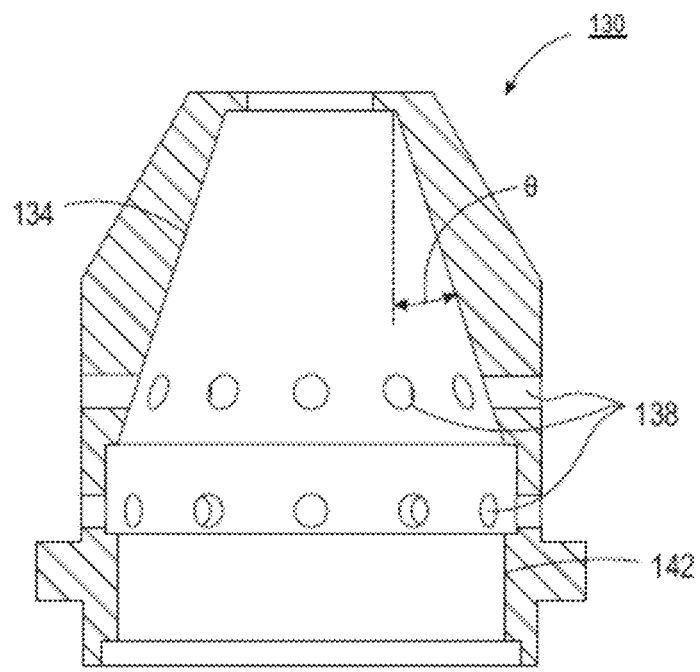
Figure 14:
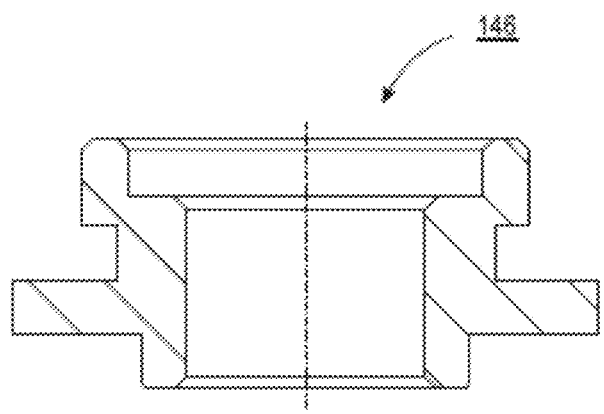
Figure 15:
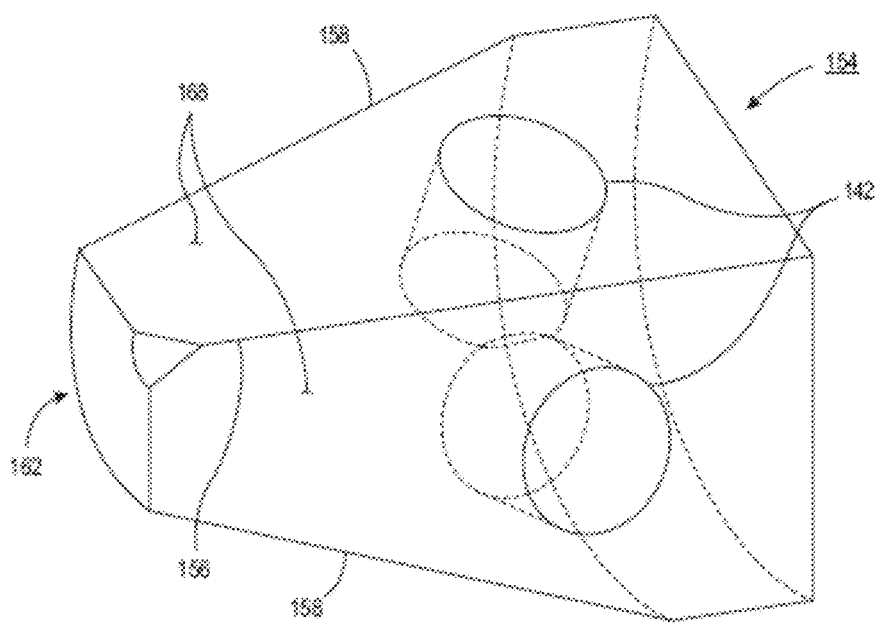

As depicted for example in FIGS. 3-4, the nozzle 128 is associated with the torch body and nozzle seat 126, and is removably affixed to the nozzle seat and torch head body 130 by friction fit thereto. As an alternative to the friction fit between the nozzle seat and the nozzle, also contemplated is a threaded connection or a bayonet-type connection therebetween. Moreover, in one embodiment the friction fit with the torch body may be provided via O-rings 124 or similar elements encircling the torch body, for example an O-ring within O-ring retaining groove 122 as depicted in FIG. 9.

Figure 18:
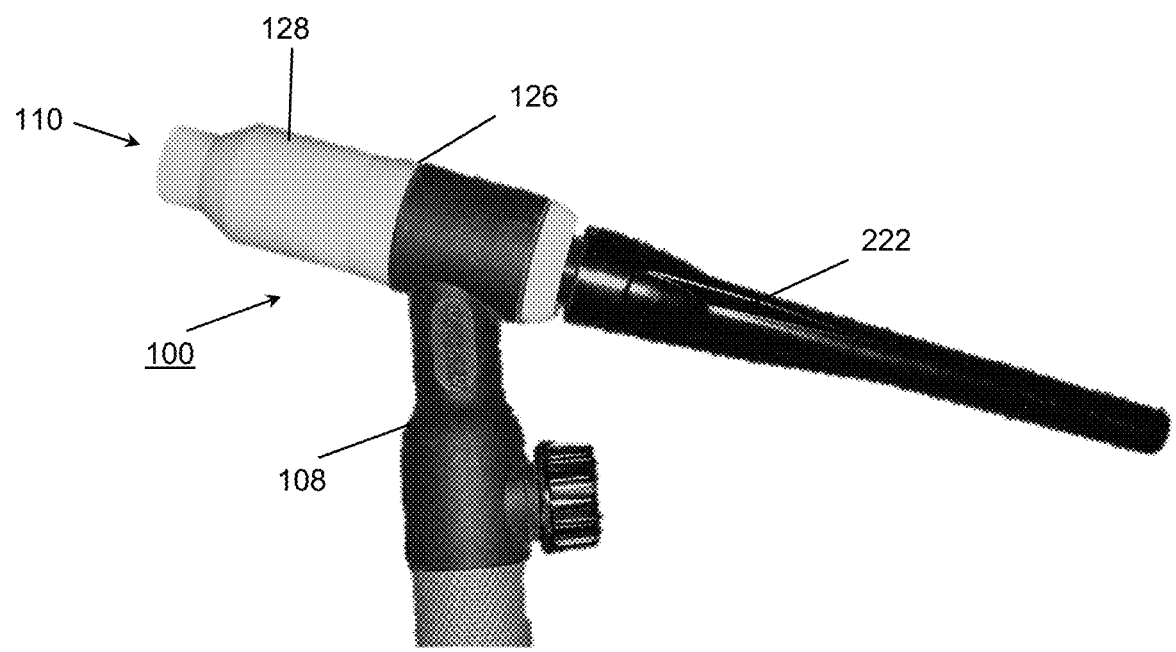
FIG. 18 is a perspective view of an alternative embodiment of the TIG welding torch with additional features.
Figure 19:
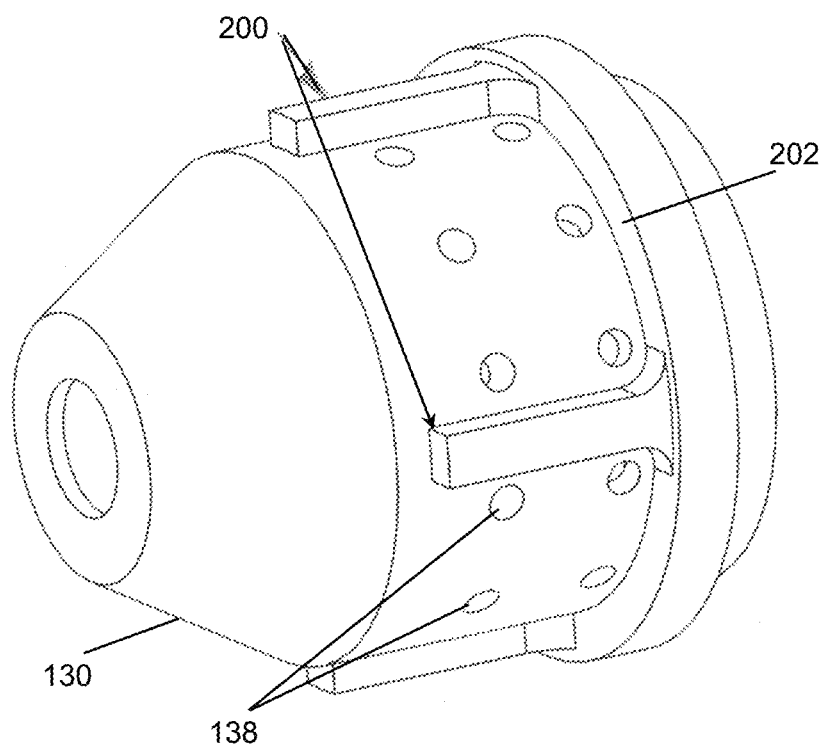
FIGS. 19-26 are detailed illustrations of various components parts used in accordance with the alternative embodiment of FIG. 18.
Figure 20:
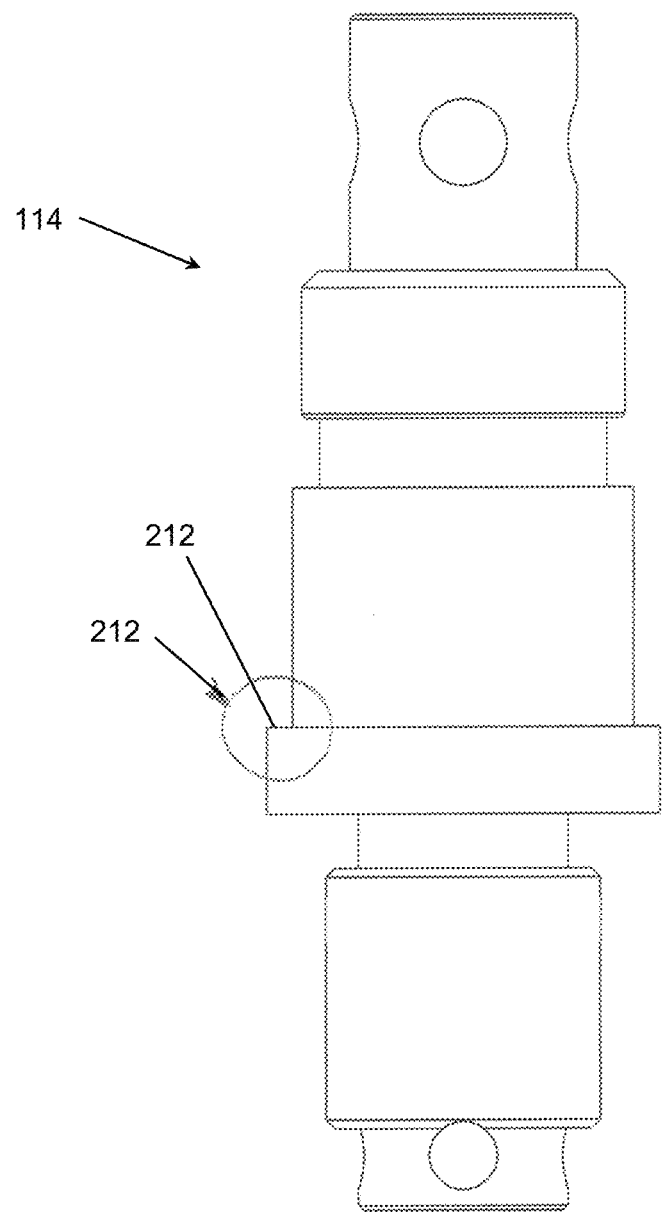

Referring also to FIG. 18, the removable torch 110 head also includes a torch head body 130 that includes a tapered interior region 134, a plurality of apertures 138 to permit gas flow therethrough, and a threaded inside diameter 142 to permit the operative engagement (e.g., threadable) of a chuck back plate 146 thereon. The chuck back plate 146 has, in one embodiment, a threaded outer diameter for engaging the threaded inner diameter of the torch body. Also within removable head 130 are at least two and typically at least three or more radially positioned electrode securing wedges (jaw pieces) 154 forming an electrode aperture therebetween within the tapered interior region of the torch body such that each securing wedge can traverse or slide, in unison, along the conical interior surface of the tapered region 134 in a longitudinal direction to form a variable aperture (jaw) therebetween. The securing wedges 154 being further contacted on an end thereof by a plunger thrust cup 160. The thrust cup 160, in further combination with the plunger 114 and back plate 146, translate rotation of the plunger relative to the back plate into linear motion of the thrust cup in contact with the electrode securing wedges, and further provide a clamping motion of the electrode securing wedges against the electrode 120 as a result of their sliding contact with the tapered surface.

In operation, electrode 120 is inserted along the interior surface of wedges 154 and clamped therein by a force applied to the interior ends of the wedges by plunger thrust cup 160. In the depicted embodiment, a compressive force is provided to the thrust cup 160 by plunger 114 being rotated relative to the torch head body 130, thereby advancing the wedges 154 in response to the rotation of the head and closing the jaw formed by the wedges about the electrode. When the plunger is rotated in the opposite direction, the plunger is retracted relative to the head body 130, and as a result the pressure applied to the wedges is removed. In the absence of pressure from the plunger 114 the electrode wedges 120, under the force of biasing member (spring) 164, slide up the jaw to expand or open the jaw. In other words, as the plunger 114 backs away from the thrust cup the biasing springs 164 force the electrode wedges apart, causing the wedges to slide the jaws back up and outward along the inner cone and keeping them against the thrust cup. There is no pulling action of the plunger or thrust cup, but the biasing force causes the wedges to move to the largest diameter position. The springs just keep everything under tension and moving in the cone during retraction. In the unlikely event that the wedges are temporarily "fixed" in one position, a slight tap with the tungsten electrode causes them to snap back and continue moving for retraction, but typically they slide back.

The rate of change of the orifice diameter formed by wedges 154 is a function of the pitch of the thread, or turns per inch (TPI) on the mating surfaces of the chuck backing plate 146 and end 118 of the hollow plunger 114, as well as included angle Θ or slope, of the posterior surface 162 of the wedge 154. The corresponding interior conical surface 134 shares a common slope angle Θ, typically in the range of 15-20 degrees. Consequently, the minimum and maximum aperture diameter is a function of the sine of angle Θ.

Furthermore, to assure that the electrode securing wedges 154 remain spaced apart when not being compressed against an electrode, each of the electrode securing wedges is biased away from an adjacent wedge, and toward the conical interior surface of the tapered region, by at least one biasing member 164 between adjacent wedges. In one embodiment the biasing members are compression springs made of stainless steel and seated in recesses 142 in each of the planar surfaces 168 of the electrode securing wedges 154. As will be appreciated, the resilient members 164 (e.g., coil compression spring) associated with each of the electrode securing wedges, biases the wedges toward the conical interior surface of the tapered region 134. It will be further appreciated that while the resilient members 164 are depicted as lying between adjacent wedges 154, or more particularly recesses 142 on the wedges, it is also possible to provide other wedge and spring configurations that bias the wedges so they tend to move outward (and therefore toward the larger diameter of the housing).

Figure 16:
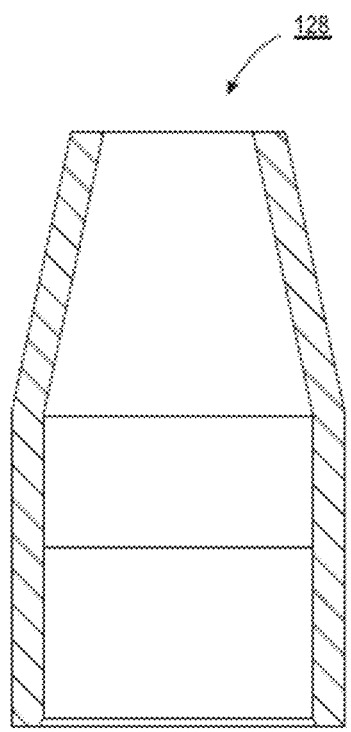
Figure 17:
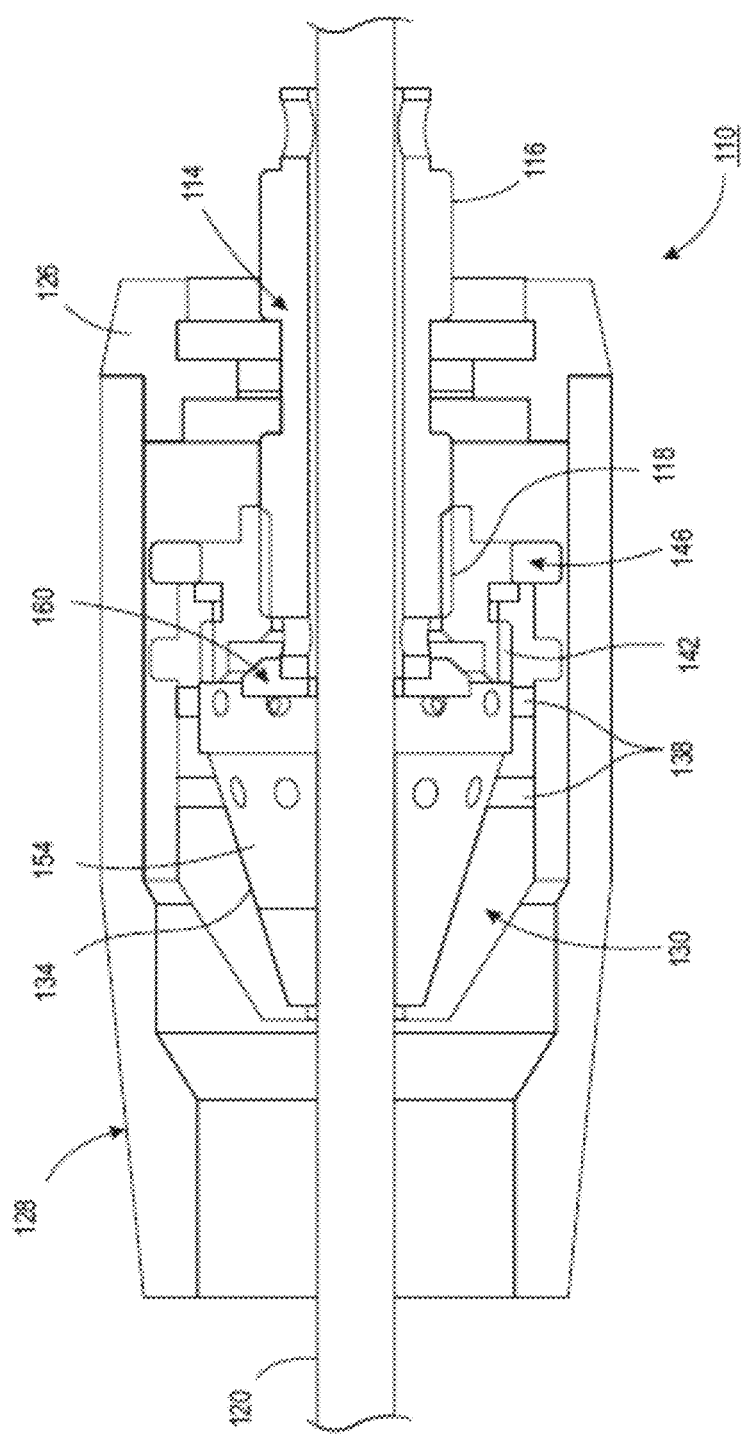
FIG. 17 is a cross-sectional view of a removable torch head in accordance with a disclosed embodiment including a torch head body with an adjustable electrode receiver.

In summary, in the torch head body 130 of the adjustable electrode receiver, the electrode securing wedges 154 each include adjacent planar surfaces sharing a first edge or transition line 156 therebetween and each having an opposite edge 158 spaced away and slightly angled relative to the first edge, and a conical surface (162, rear of wedge in FIG. 16) spanning between the opposite edges of the planar surfaces 168, and where at least one of the planar surfaces includes an aperture therein (to receive an end of the coil compression spring 164). As will be further appreciated, the transition line 156, between adjacent planar surfaces of the electrode securing wedge, provides a continuous region (e.g., along the line) for contact between the wedge and the electrode.

Figure 6:
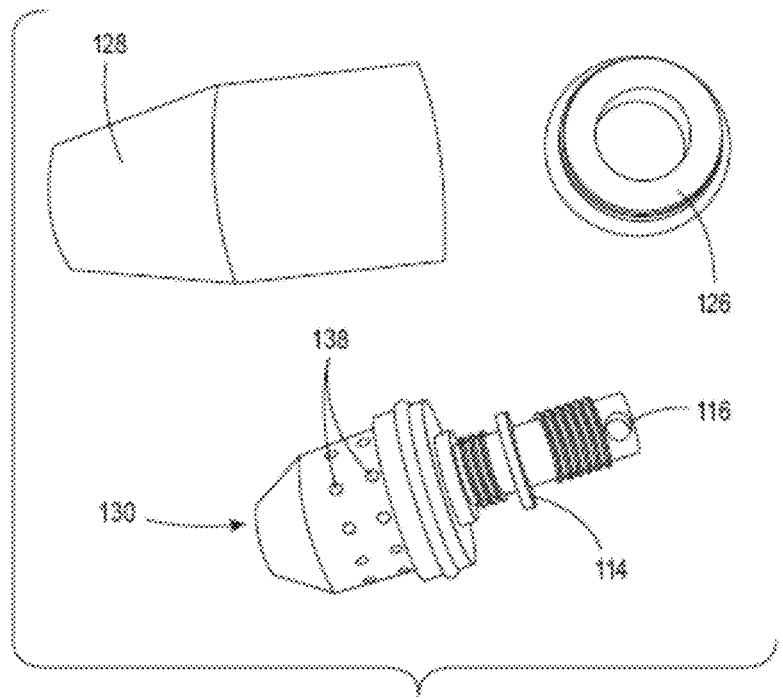
Figure 7:
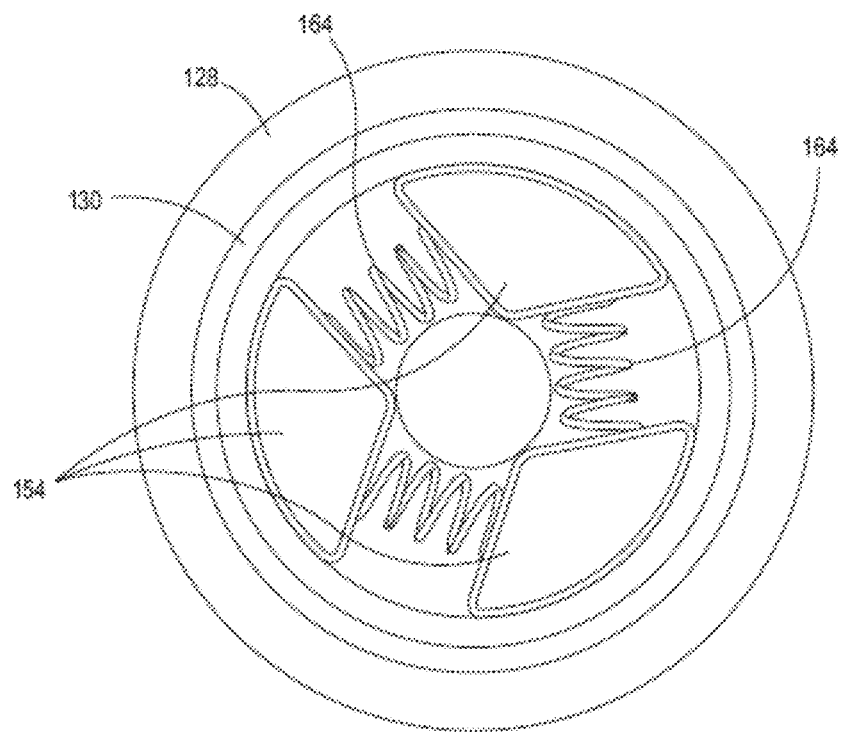
Figure 8:
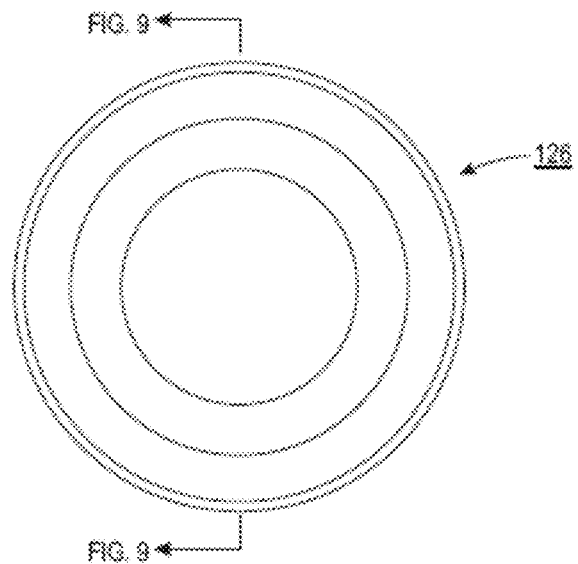
FIGS. 8-16 are detailed drawings of various components parts illustrated in FIGS. 1-7 in accordance with a disclosed embodiment.

To assure the flow of electrical current through the torch head body 130 and into the wedges 154 and associated electrode 129, the internal conical surface 134 remains in contact with each securing wedge over at least a portion if not all of the outer wedge surface, in order to reduce contact heating. In one embodiment the wedges are formed of an electrically conductive metal, such as an alloy—for example a steel alloy, a copper alloy (e.g., brass, bronze) or a nickel alloy. As illustrated in FIG. 7, one embodiment employs three electrode securing wedges 154 in the head 130. And, the securing wedges 154 further provide electrical contact between electrode 120 and the conical surface 134 of the torch body 130. In the embodiments depicted, for example in FIGS. 6. 7 and 18, the radially positioned electrode securing wedges 154 within the torch head body 130 are able to receive an electrode diameter of at least about 0.145 inches or larger.

As previously noted, the nozzle 128, encircles the torch body to direct the inert gas along and through the torch head and the nozzle is operatively attached at one end thereof to the nozzle seat 126.

Referring next to FIGS. 18-26, depicted therein are various illustrations of an alternative embodiment for the removable electric arc welding torch head. In this embodiment, as particularly depicted in FIGS. 20, 22 and 24, an external shoulder 212 is added to plunger 114 and a corresponding interior shoulder 224, in region 226, is added to nozzle seat 126, to avoid the possibility of the nozzle seat 126 being inadvertently removed from the torch head when a user removes the outermost ceramic nozzle 128. More specifically, the removable torch head 110 of FIG. 19 includes a hollow plunger 114 adapted to fit the torch body. In this embodiment, however, plunger 114 includes a shoulder 214 that matches a corresponding shoulder 224 on the nozzle seat 128 to assure that the seat does not inadvertently come off the torch when the ceramic nozzle 128 is removed from the torch head 100. Also illustrated in FIG. 18 is a tailpiece, at the rear or back end of the torch, which encloses the portion of the electrode (not shown) extending through the torch head.

A second feature of the alternative embodiment includes the ability to actuate the chuck without having to remove the ceramic nozzle. In the alternative embodiment, the chuck body and ceramic nozzle are modified to further include operatively interlocking features, such as keys and keyways, so the nozzle can actuate the chuck without removal. To illustrate this feature more specifically, attention is turned to FIGS. 19, 21, 23, 25 and 26. In the side perspective view of FIG. 19, for example, one of the operatively interlocking features is depicted. Nozzle head 130 is modified to include external structures such as keys 200. The keys 200 are positioned at approximately every 90-degrees about the outer circumferential surface of the head and extend from an annular exterior shoulder 202. The keys each have a generally rectangular cross-section, although the outermost surface and edges thereof may be radiused or angled slightly to facilitate the keys interlocking with the keyways when the nozzle 128 is slidably placed over the nozzle head 130.

Figure 21:
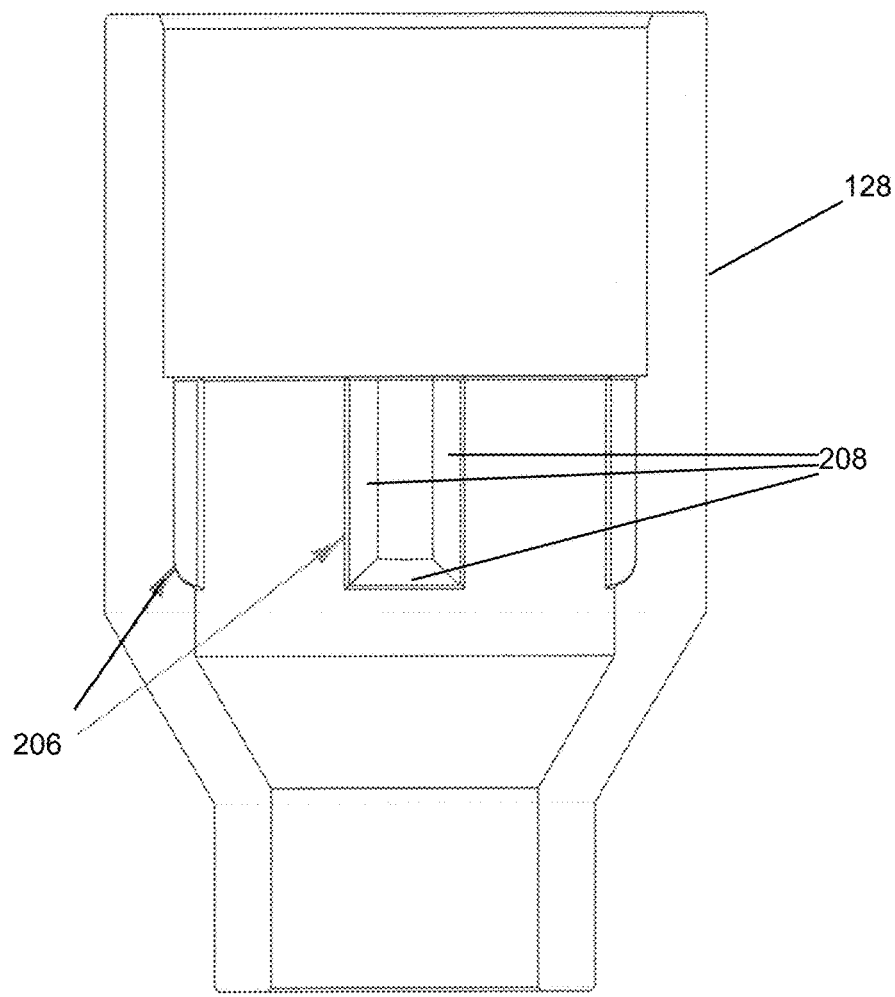
Figure 22:
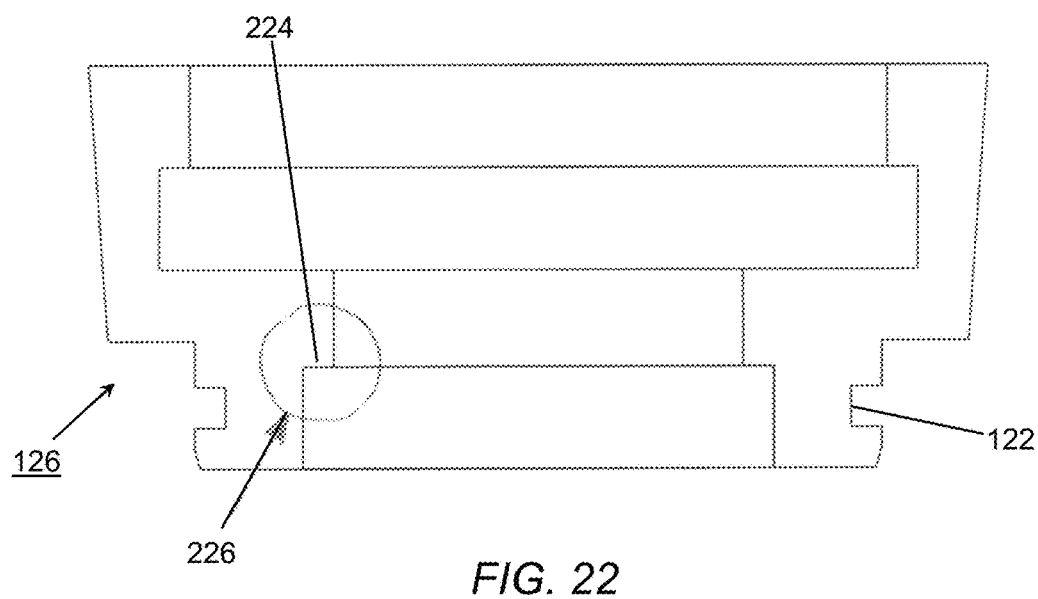
Figure 23:
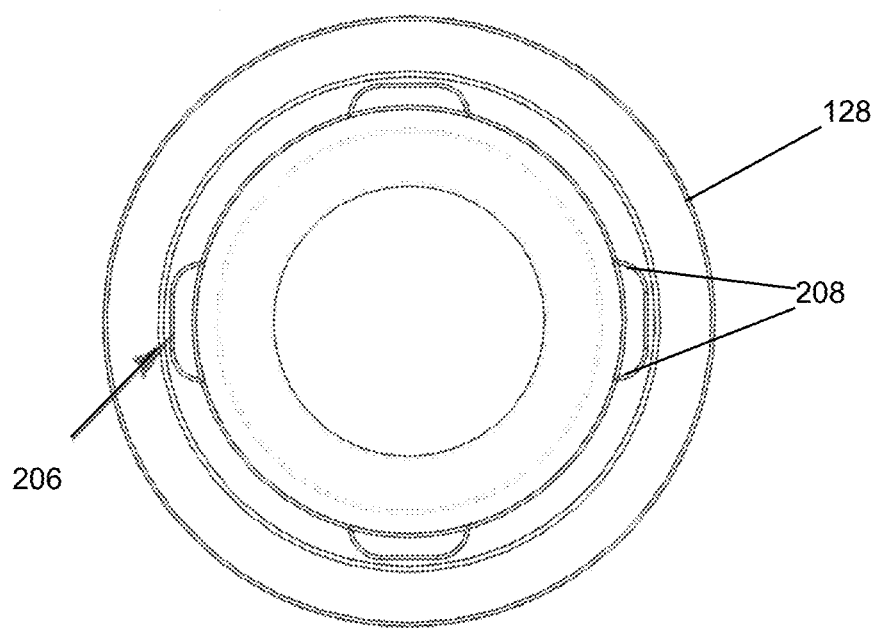
Figure 24:
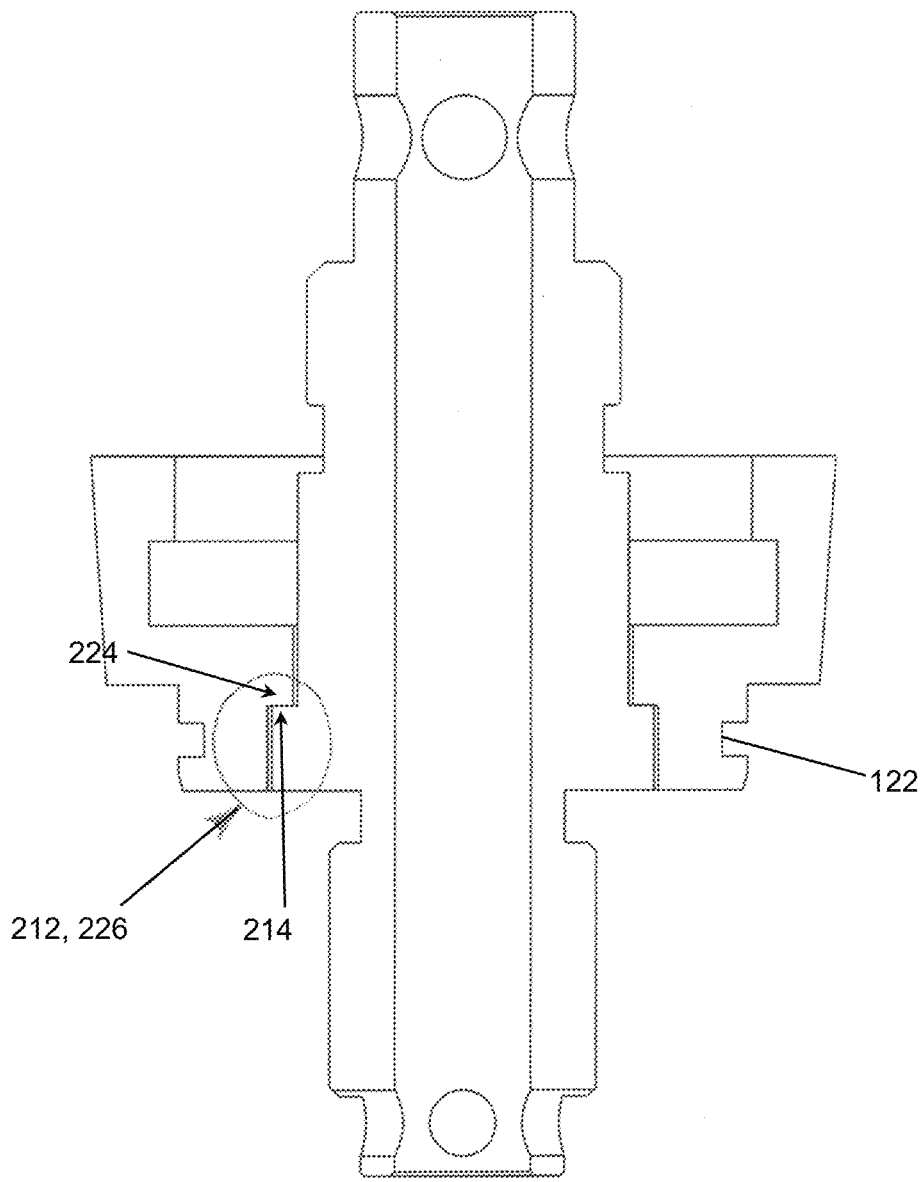
Figure 25:
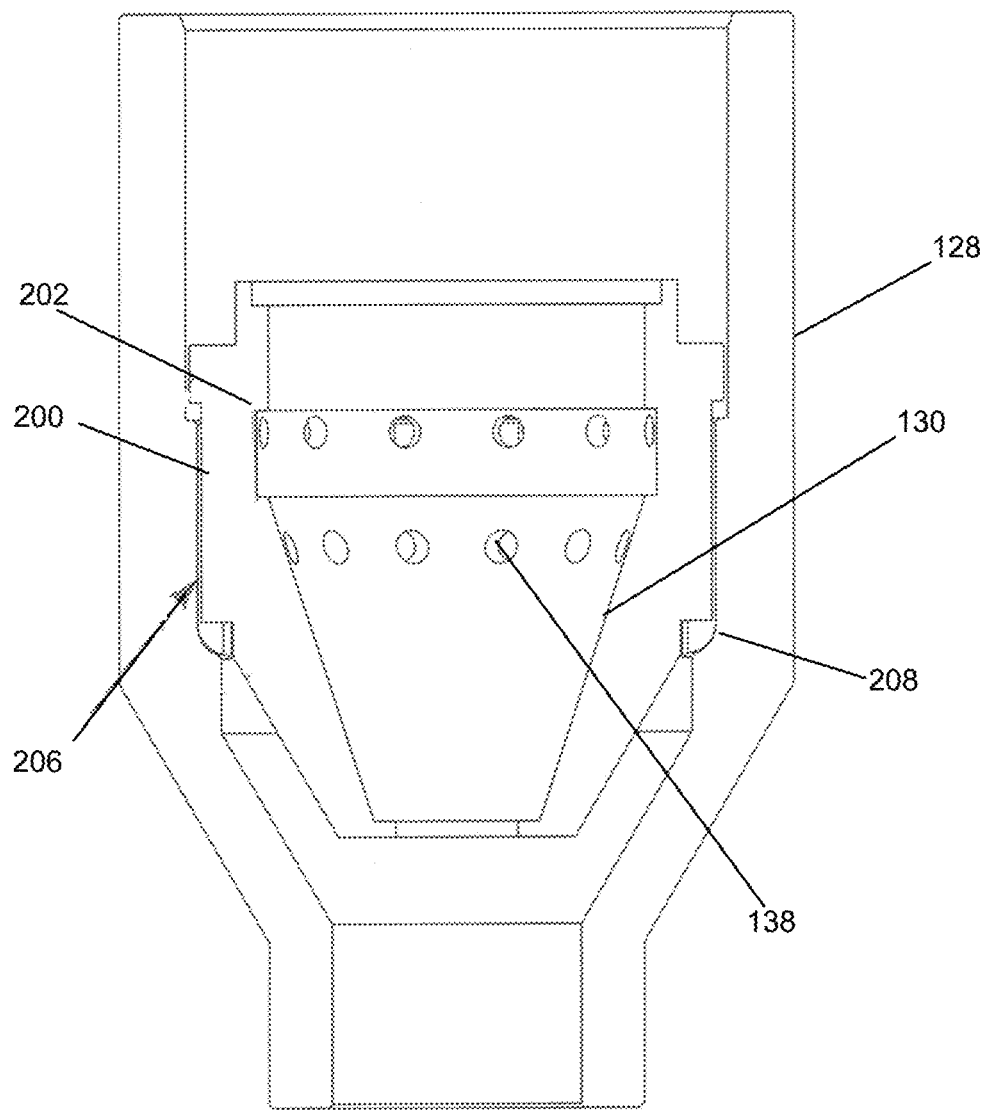
Figure 26:
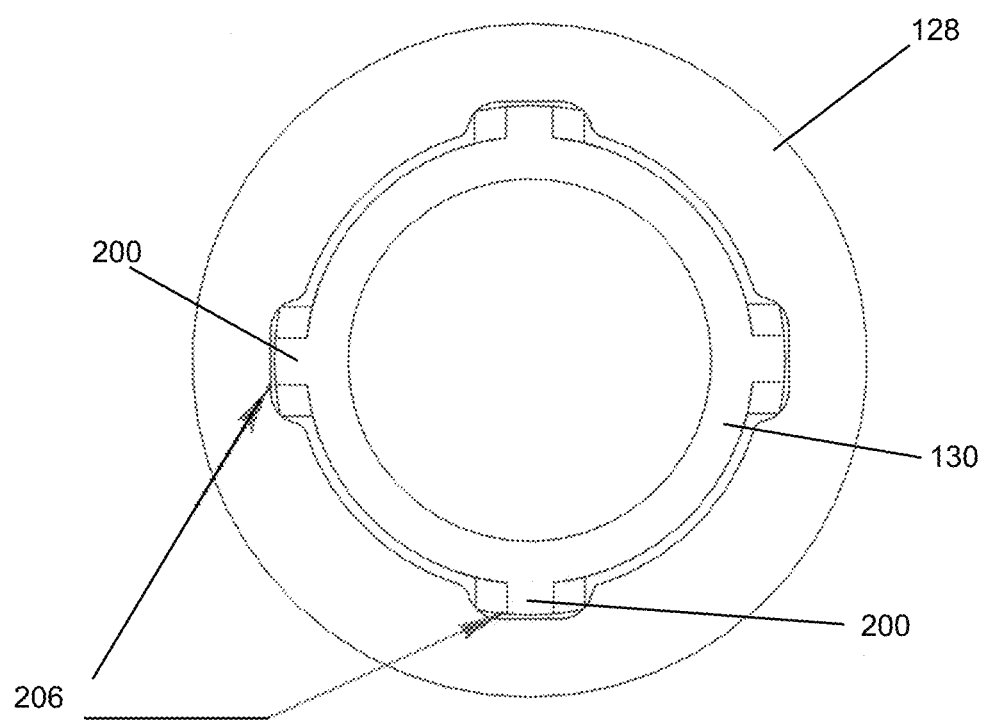

In accordance with the alternative embodiment, FIG. 21 depicts a cross-sectional view of ceramic nozzle 128 and FIG. 23 depicts an end view of nozzle 128. FIG. 21 illustrates that the ceramic nozzle of the alternative embodiment includes corresponding keyways 206 on the interior thereof, and as clearly depicted in the end view of FIG. 23 the keyways 206 are similarly spaced about the interior surface of the nozzle at approximately every 90-degrees. Each of the keyways 206 may be constructed in a manner such that some or all of the outer surfaces 208 are tapered (angled) or radiused as shown in FIG. 23 so that the corresponding keys 200 are easily aligned with and fit within the keyways, for example as depicted in the assembled views such as the cross-sectional assembly view of FIG. 25 and the end view of FIG. 26.

As will be appreciated the rotation of the nozzle 128 relative to torch head 130 will result in the keys 200 engaging the keyways 206, and thereby cause the head 130 to similarly rotate relative to the chuck plate of the torch as previously described, thereby causing the movement of the securing wedges along the interior tapered surface of the head 130 as shown and described above relative to the first embodiment. In other words, rotation of head 130 will likewise result in a corresponding change of force applied to the securing wedges so that the clearance between the wedges changes—rotation in one direction increases clearance and rotation in the opposite direction decreases clearance.

While the interlocking feature between the nozzle and torch head are depicted and described as a key and keyway combination, it will be appreciated that the position, shape, size and number of key/keyway pairs may be varied while remaining within the spirit and scope of the instant disclosure of an interlocking feature(s). Moreover, there may be alternative mechanisms that could be employed to provide the operative interlocking of such components, mechanisms such as pins, collars, (threaded or unthreaded) and the like.

In recapitulation, as illustrated in the figures, a removable torch head is provided with a variable sized electrode receiver is provided. A plurality of electrode securing wedges 154 are positioned radially within the torch head body 130 and form an aperture therebetween, where the aperture size is adjustable based upon the position of the wedges relative to an internal conical surface 134 within the body. Use of the disclosed embodiments is believed to result in improved productivity by at least eliminating the need to change collets when switching between various electrode diameters or shapes. Moreover, the replaceable head is easily installed and adapted for use with convention inert gas welding torches.

It will be appreciated that several of the above-disclosed embodiments and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the description above and the following claims.

What is claimed is:

1. A removable electric arc welding torch head having an adjustable electrode receiver, comprising:
   a hollow plunger, having a first end for threadable connection to a welding torch;
   a nozzle seat, surrounding and operatively connected about the first end of the plunger;
   a torch head body including a tapered interior region, a plurality of apertures to permit gas flow therethrough, and a threaded inside diameter to permit the operative engagement of a chuck back plate thereon, the chuck back plate having an outer diameter for engaging the inner diameter of the torch body, a plurality of radially positioned electrode securing wedges forming an electrode aperture therebetween within the tapered interior region of the torch body such that each securing wedge can traverse, in unison, a conical interior surface of the tapered region in a longitudinal direction to form a variable aperture therebetween, said securing wedges being further contacted on an end thereof by a plunger thrust cup, the thrust cup in further combination with the plunger and back plate, translating rotation of the plunger relative to the back plate into linear motion of the thrust cup in contact with the electrode securing wedges, and further providing a clamping motion of the electrode securing wedges as a result of their contact with the tapered surface, each of said electrode securing wedges biased away from one another, by at least one biasing member therebetween, and an internal conical surface in contact with each securing wedge, said securing wedges further providing electrical contact between an electrode and the conical surface of the torch body; and a nozzle, encircling the torch body and operatively attached at one end thereof to the nozzle seat.

2. The adjustable electrode receiver according to claim 1 where each of the electrode securing wedges further includes at least one surface feature to receive a portion of the biasing member therein.

3. The adjustable electrode receiver according to claim 1 where said hollow plunger is suitable for threaded connection to a conventional torch.

4. The adjustable electrode receiver according to claim 1 where said conventional torch is selected from the group consisting of an HW20 torch and a WP 20 torch.

5. The adjustable electrode receiver according to claim 1 where a combination of said torch body and said plurality of radially positioned electrode securing wedges are able to receive an electrode having a diameter up to at least 0.145 inches.

6. The adjustable electrode receiver according to claim 1 where said plurality of radially positioned electrode securing wedges are each formed of an alloy.

7. The adjustable electrode receiver according to claim 1 where said nozzle is formed of a machinable ceramic material.

8. The adjustable electrode receiver according to claim 1 where said nozzle is formed of a material suitable for high-temperature use.

9. The adjustable electrode receiver according to claim 8 where said material suitable for high-temperature use is a glass-filled polytetrafluoroethylene (PTFE).

10. The adjustable electrode receiver according to claim 1 where said nozzle seat is formed of a material suitable for high-temperature use.

11. The adjustable electrode receiver according to claim 10 where said material suitable for high-temperature use is a glass-filled polytetrafluoroethylene (PTFE).

12. The adjustable electrode receiver according to claim 1 where said at least one biasing member is a coil spring positioned between adjacent electrode securing wedges.

13. The adjustable electrode receiver according to claim 1 including at least three electrode securing wedges.

14. The adjustable electrode receiver according to claim 13 wherein each of said electrode securing wedges includes adjacent planar surfaces each sharing a first edge or transition therebetween and each having an opposite edge spaced away and slightly angle relative to the first edge, and a conical surface spanning between the opposite edges of the planar surfaces.

15. The adjustable electrode receiver according to claim 14 wherein the first edge or transition between adjacent planar surfaces of the electrode securing wedge provides a continuous region of contact with the electrode.

16. The adjustable electrode receiver according to claim 1 wherein said torch head body includes apertures therein to facilitate movement of inert gas through and around the torch head body.

17. The adjustable electrode receiver according to claim 1 wherein said nozzle is associated with the torch body nozzle seat and is removably affixed to the nozzle seat and torch body by friction fit thereto.

18. The adjustable electrode receiver according to claim 1 wherein said nozzle and said seat include at least one interlocking feature where rotation of the nozzle relative to the head results in similar rotation of the nozzle seat, and in turn actuation of the securing wedges.

19. A removable electric arc welding torch head having an adjustable electrode receiver, comprising:

a hollow plunger, having a first end for threadable connection to a welding torch;

a nozzle seat, surrounding and operatively connected about the first end of the plunger;

a torch head body including
a tapered interior region, a plurality of apertures to permit gas flow therethrough, and a threaded inside diameter to permit the operative engagement of a chuck back plate thereon, the chuck back plate having an outer diameter for engaging the inner diameter of the torch body, a plurality of radially positioned electrode securing wedges forming an electrode aperture therebetween within the tapered interior region of the torch body such that each securing wedge can traverse, in unison, a conical interior surface of the tapered region in a longitudinal direction to form a variable aperture therebetween, said securing wedges being further contacted on an end thereof by a plunger thrust cup, the thrust cup in further combination with the plunger and back plate, translating rotation of the plunger relative to the back plate into linear motion of the thrust cup in contact with the electrode securing wedges, and further providing a clamping motion of the electrode securing wedges as a result of their contact with the tapered surface, each of said electrode securing wedges biased away from one another, by at least one biasing member therebetween, and an internal conical surface in contact with each securing wedge, said securing wedges further providing electrical contact between an electrode and the conical surface of the torch body; and a nozzle, encircling the torch body and operatively attached at one end thereof to the nozzle seat, wherein said nozzle and said seat include at least one interlocking feature in operative contact, and where rotation of the nozzle relative to the head results in similar rotation of the nozzle seat, and in turn actuation of the securing wedges.

20. The adjustable electrode receiver according to claim 1 where the interlocking features include at least one keyway on an interior of the nozzle and a corresponding key on an exterior of the torch head body.

\* \* \* \* \*